(12) United States Patent
Kondo

(10) Patent No.: US 8,670,152 B2
(45) Date of Patent: Mar. 11, 2014

(54) PRINT CONTROLLER AND METHOD FOR REDUCING MEMORY USAGE IN DETERMINING CANDIDATE PIXELS FOR BLEED SUPPRESSION

(75) Inventor: Masaki Kondo, Toyoake (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 84 days.

(21) Appl. No.: 12/862,284

(22) Filed: Aug. 24, 2010

(65) Prior Publication Data
US 2011/0063637 A1    Mar. 17, 2011

(30) Foreign Application Priority Data
Sep. 17, 2009  (JP) ................................ 2009-215623

(51) Int. Cl.
*H04N 1/60*    (2006.01)
(52) U.S. Cl.
USPC ........... 358/1.9; 358/2.1; 358/3.24; 358/3.26; 358/3.27; 358/529
(58) Field of Classification Search
USPC .......................... 358/1.9, 3.26–3.27, 517–536
See application file for complete search history.

(56) References Cited

U.S. PATENT DOCUMENTS

| | | | |
|---|---|---|---|
| 5,172,223 A | | 12/1992 | Suzuki et al. |
| 5,428,377 A | * | 6/1995 | Stoffel et al. .................... 347/15 |
| 5,630,026 A | * | 5/1997 | Ogletree et al. ............... 358/1.7 |
| 5,881,210 A | * | 3/1999 | Guay et al. ..................... 358/1.9 |
| 5,992,971 A | * | 11/1999 | Takahashi et al. .............. 347/43 |
| 6,084,604 A | * | 7/2000 | Moriyama et al. .............. 347/15 |
| 6,118,548 A | * | 9/2000 | Ryan .............................. 358/1.9 |
| 6,233,061 B1 | * | 5/2001 | Huang et al. .................... 358/1.9 |
| 6,312,102 B1 | * | 11/2001 | Moriyama et al. .............. 347/43 |
| 6,445,463 B1 | * | 9/2002 | Klassen ......................... 358/1.9 |
| 6,975,428 B1 | * | 12/2005 | Ernst et al. ..................... 358/1.9 |
| 7,564,604 B2 | * | 7/2009 | Shirasawa ...................... 358/529 |
| 7,587,098 B2 | * | 9/2009 | Kim et al. ...................... 382/256 |
| 7,733,546 B2 | * | 6/2010 | Yamada ......................... 358/518 |

(Continued)

FOREIGN PATENT DOCUMENTS

| | | |
|---|---|---|
| EP | 1 191 784 A1 | 3/2002 |
| EP | 2 214 126 A2 | 8/2010 |

(Continued)

OTHER PUBLICATIONS

JPO Machine Translation of JP2003-048340.*

(Continued)

*Primary Examiner* — Richard Zhu
(74) *Attorney, Agent, or Firm* — Scully, Scott, Murphy & Presser, P.C.

(57) ABSTRACT

A print controller controls a printing unit to print an image on a recording medium by using a black ink and M chromatic color inks. The print controller stores a part of image data having a plurality of sets of pixel data and determines whether one pixel data set is subject pixel data to be subjected to bleed suppression and includes: setting the one pixel data set as target pixel data; setting, as peripheral pixel data, pixel data set corresponding to a pixel located within a prescribed range from a target pixel; acquiring the N color value set of the target pixel data; acquiring the N color value set of the peripheral pixel data; and determining whether the target pixel data is the subject pixel data based on the N color value sets.

12 Claims, 10 Drawing Sheets

(56) References Cited

U.S. PATENT DOCUMENTS

| | | | |
|---|---|---|---|
| 2003/0063301 A1* | 4/2003 | Klassen | 358/1.9 |
| 2005/0140997 A1* | 6/2005 | Shirasawa | 358/1.9 |
| 2005/0231742 A1* | 10/2005 | Hirano | 358/1.9 |
| 2008/0213493 A1 | 9/2008 | Mizutani et al. | |

FOREIGN PATENT DOCUMENTS

| | | | |
|---|---|---|---|
| JP | 1174455 A | | 7/1989 |
| JP | 6-113155 | | 4/1994 |
| JP | 7125409 A | | 5/1995 |
| JP | 2001157066 A | | 6/2001 |
| JP | 2001-223915 | | 8/2001 |
| JP | 2001223915 A | | 8/2001 |
| JP | 2003048340 A | * | 2/2003 |
| JP | 2003198863 A | | 7/2003 |
| JP | 2004312193 A | | 11/2004 |
| JP | 2005109802 A | | 4/2005 |
| JP | 2007007899 A | | 1/2007 |
| JP | 2008239964 A | | 10/2008 |

OTHER PUBLICATIONS

Extended European Search Report dated Dec. 9, 2011 from related European Patent Application No. 10251473.4.
Japanese Official Action dated Feb. 26, 2013 received in related application JP 2009-215623.

* cited by examiner

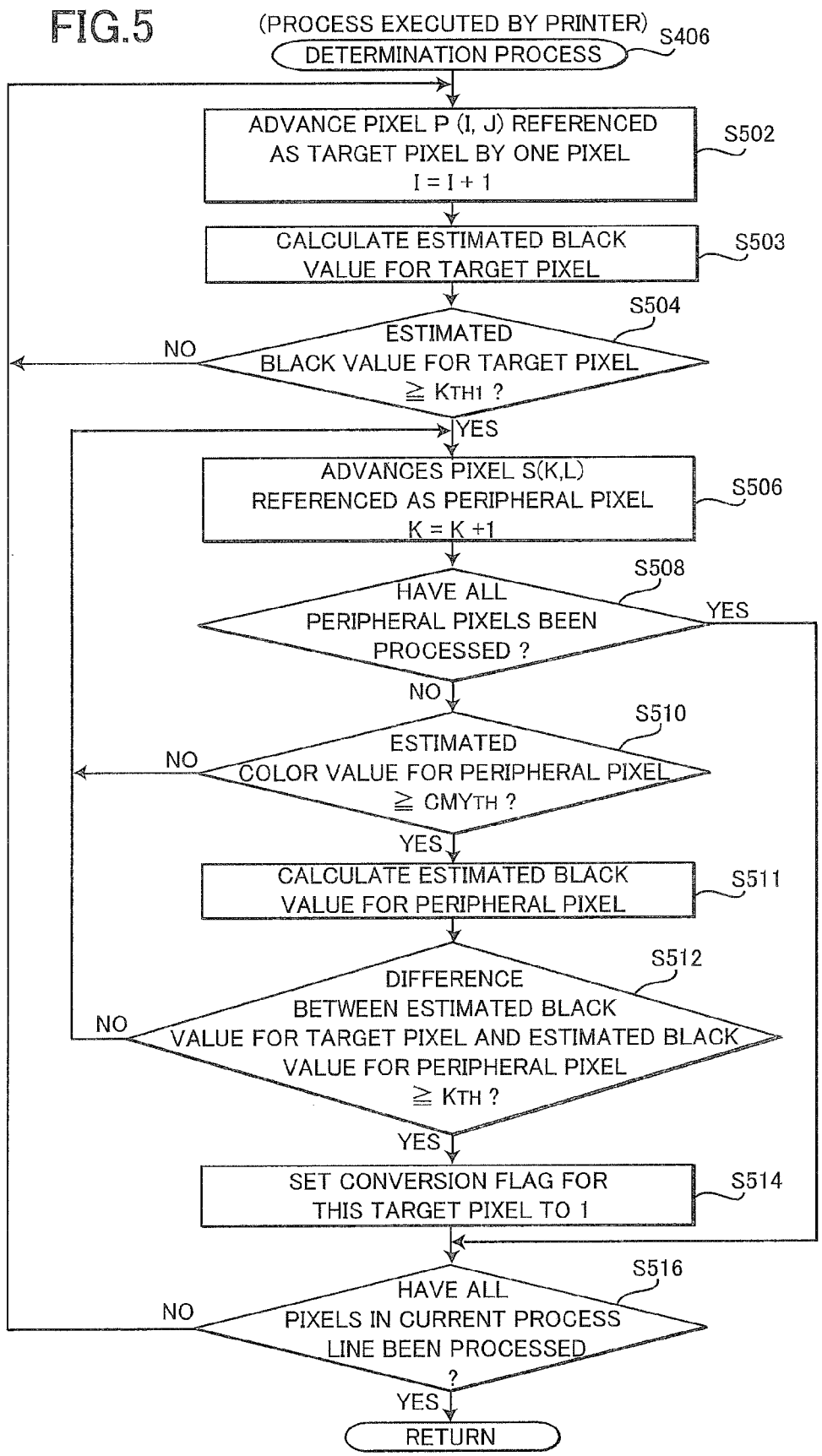

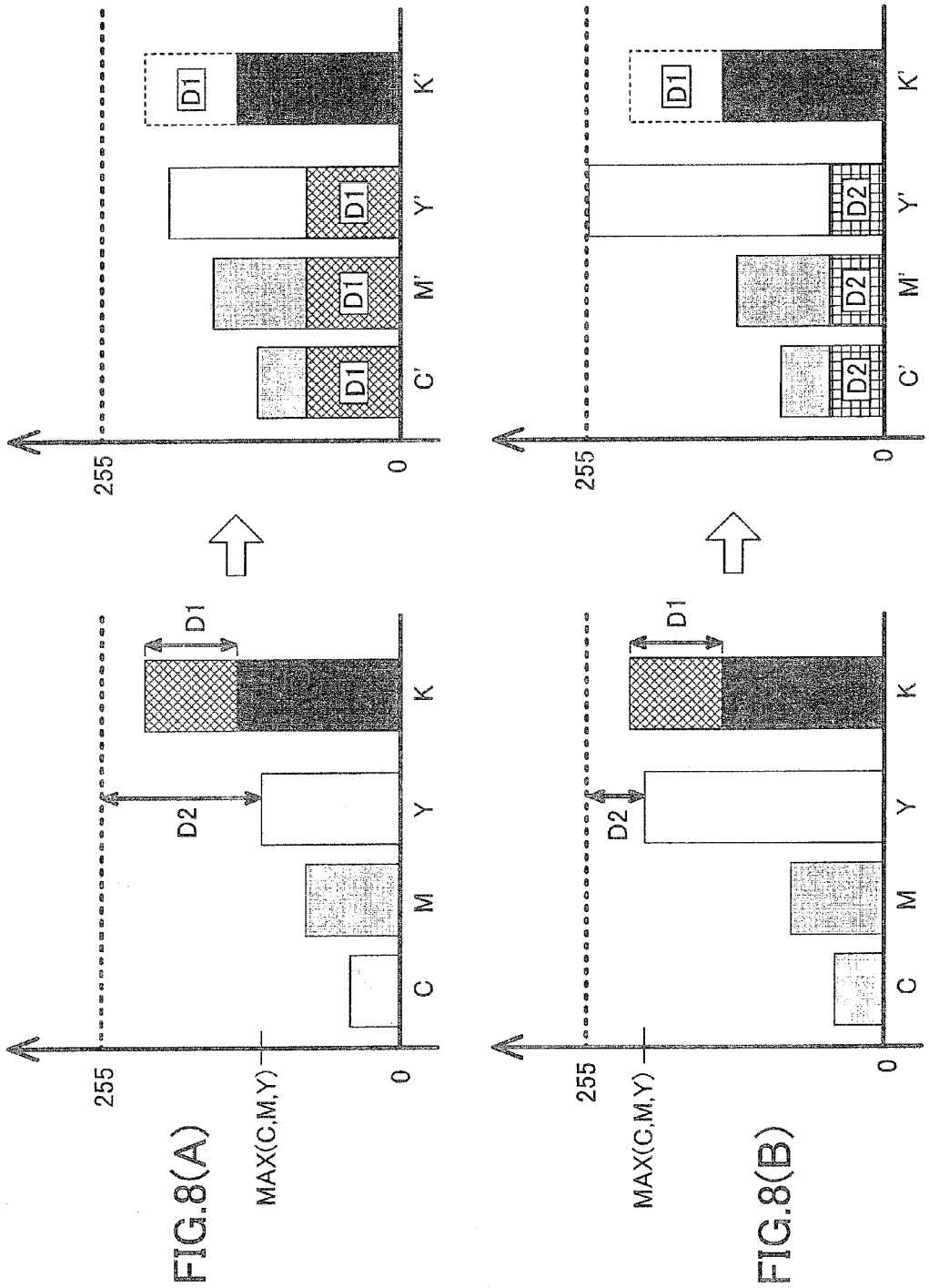

PRINT CONTROLLER AND METHOD FOR REDUCING MEMORY USAGE IN DETERMINING CANDIDATE PIXELS FOR BLEED SUPPRESSION

CROSS REFERENCE TO RELATED APPLICATION

This application claims priority from Japanese Patent Application No. 2009-215623 filed Sep. 17, 2009. The entire content of the priority application is incorporated herein by reference.

TECHNICAL FIELD

The present invention relates to a print controller.

BACKGROUND

There have been proposed inkjet printing devices capable of executing a bleed suppression process for reducing the likelihood of black ink bleeding into neighboring color pixels. In this process, the printing device finds pixels that meet a prescribed condition, such as having a color pixel on the periphery thereof, sets these pixels as candidate pixels for bleed suppression, and substitutes a combination of color ink in a plurality of colors for the black ink of these target pixels. Thus, the printing device prints the black color of these target pixels without using black ink.

When checking each pixel of an image to determine whether the pixel needs to be processed to suppress bleeding, the printing device must reference not only the target pixel being checked, but also the peripheral pixels within a prescribed range of the target pixel. Since it is inefficient to reference image data stored on a hard disk drive or other storage medium directly because a considerable amount of time is required to read such image data, image data for the image to be printed is read into a band buffer capable of storing five lines worth of data, for example, and a process is performed on the data stored in the band buffer to determine which pixels must be subjected to the bleed suppression process.

SUMMARY

However, conventional printing devices have saved image data for all four colors, such as the four colors cyan (C), magenta (M), yellow (Y), and black (K), in the band buffer and have determined which pixels must be subjected to the bleed suppression process based on this image data. Consequently, if image data for one color component is represented in one byte of data, the band buffer must be designed to store [(number of pixels in a horizontal line)×5 (number of reference lines)×4 (number of colors)] bytes and, thus, requires a large memory area.

In view of the foregoing, it is an object of the present invention to provide a print controller and a print control program capable of reducing the amount of memory used when determining candidate pixels for bleed suppression.

In order to attain the above and other objects, the invention provides a print controller includes a controlling unit, a storage unit, a subject pixel data determining unit, a converting unit, and an adjusting unit. The controlling unit is configured to control a printing unit to print an image on a recording medium by using a black ink and M chromatic color inks whose 'M' is an integer equal to or greater than 1. The black ink reproduces black defined in a first color space and has permeability to the recording medium. Each chromatic color ink reproduces one of M chromatic colors that are defined in the first color space and has permeability to the recording medium different from the permeability of the black ink. The storage unit is configured to store a part of image data. The image data has a plurality of sets of pixel data. The image data represents an image including pixels. Each set of pixel data corresponds to one pixel and has a set of N color values. Each color value indicating one of N colors that are defined in a second color space. The second color space is different from the first color space. N is an integer that is greater than or equal to 1 and smaller than (M+1). The subject pixel data determining unit is configured to determine, for one set of pixel data, whether or not the one pixel data set is subject pixel data to be subjected to bleed suppression. The subject pixel data determining unit includes a target pixel data setting unit, a peripheral pixel data setting unit, a target-pixel color value acquiring unit, a peripheral-pixel color value acquiring unit, and a first determining unit. The target pixel data setting unit is configured to set the one pixel data set as target pixel data. The peripheral pixel data setting unit is configured to set, as peripheral pixel data, pixel data set corresponding to a pixel that is located within a prescribed range from a pixel corresponding to the target pixel data. The target-pixel color value acquiring unit is configured to acquire the N color value set of the target pixel data. The peripheral-pixel color value acquiring unit is configured to acquire the N color value set of the peripheral pixel data. The first determining unit is configured to determine, based on the N color value set of the target pixel data and the N color value set of the peripheral pixel data set, whether or not the target pixel data is the subject pixel data. The converting unit is configured to convert, for each pixel data set, the N color values to a set of (M+1) color values defined in the first color space. Each (M+1) color value set including a black value and M color values. The black value indicates the amount of the black inks to be used. Each of M color values indicates the amount of one among the M color inks to be used. The adjusting unit is configured to adjust, for each subject pixel data, the (M+1) color value set by decreasing the black value. The control unit controls the printing unit to form an image using the adjusted (M+1) color value set.

According to another aspect, the present invention provides a method for controlling a printing unit to print an image on a recording medium by using a black ink and M chromatic color inks whose 'M' is an integer equal to or greater than 1, the black ink reproducing black that is defined in a first color space and having permeability to the recording medium, each chromatic color ink reproducing one of M chromatic colors that are defined in the first color space and having permeability to the recording medium different from the permeability of the black ink. The method includes: storing a part of image data into a storage unit contained in a print controller, the image data having a plurality of sets of pixel data, the image data representing an image including pixels, each set of pixel data corresponding to one pixel and having a set of N color values, each color value indicating one of N colors that are defined in a second color space, the second color space being different from the first color space, N being an integer that is greater than or equal to 1 and smaller than (M+1); determining, for one set of pixel data, whether or not the one pixel data set is subject pixel data to be subjected to bleed suppression, the determining including: setting the one pixel data set as target pixel data; setting, as peripheral pixel data, pixel data set corresponding to a pixel that is located within a prescribed range from a pixel corresponding to the target pixel data; acquiring the N color value set of the target pixel data; acquiring the N color value set of the peripheral pixel data; and determining, based on the N color value set of the target pixel data and the N color value set of the peripheral pixel data set, whether or not the target pixel data is the subject pixel data; converting, for each pixel data set, the N color values to a set of (M+1) color values defined in the first color space, each (M+1) color value set including a black value and M color values, the black value indicating the amount of the black inks to be used, each of M color values indicating the amount of one among the M color inks to be used; adjusting, for each subject pixel data, the (M+1) color value set by decreasing the black value; and controlling the printing unit to form an image using the adjusted (M+1) color value set.

According to another aspect, the present invention provides a non-transitory computer readable storage medium storing a set of program instructions installed on and executed by a print controller for controlling a printing unit to print an image on a recording medium by using a black ink and M chromatic color inks whose 'M' is an integer equal to or greater than 1, the black ink reproducing black that is defined in a first color space and having permeability to the recording medium, each chromatic color ink reproducing one of M chromatic colors that are defined in the first color space and having permeability to the recording medium different from the permeability of the black ink. The program instructions include: storing a part of image data into a storage unit contained in a print controller, the image data having a plurality of sets of pixel data, the image data representing an image including pixels, each set of pixel data corresponding to one pixel and having a set of N color values, each color value indicating one of N colors that are defined in a second color space, the second color space being different from the first color space, N being an integer that is greater than or equal to 1 and smaller than (M+1); determining, for one set of pixel data, whether or not the one pixel data set is subject pixel data to be subjected to bleed suppression, the determining including: setting the one pixel data set as target pixel data; setting, as peripheral pixel data, pixel data set corresponding to a pixel that is located within a prescribed range from a pixel corresponding to the target pixel data; acquiring the N color value set of the target pixel data; acquiring the N color value set of the peripheral pixel data; and determining, based on the N color value set of the target pixel data and the N color value set of the peripheral pixel data set, whether or not the target pixel data is the subject pixel data; converting, for each pixel data set, the N color values to a set of (M+1) color values defined in the first color space, each (M+1) color value set including a black value and M color values, the black value indicating the amount of the black inks to be used, each of M color values indicating the amount of one among the M color inks to be used; adjusting, for each subject pixel data, the (M+1) color value set by decreasing the black value; and controlling the printing unit to form an image using the adjusted (M+1) color value set.

BRIEF DESCRIPTION OF THE DRAWINGS

The particular features and advantages of the invention as well as other objects will become apparent from the following description taken in connection with the accompanying drawings, in which:

FIG. 5 is a flowchart illustrating steps in the determination process of the bleed suppression printing process shown in FIG. 4;

FIG. 8(A) is an explanatory diagram showing how the printing device adjusts amount of each ink by performing the bleed suppression process when a first black substitution value D1 is smaller than or equal to a second black substitution value D2;

FIG. 8(B) is an explanatory diagram showing how the printing device adjusts amount of each ink by performing the bleed suppression process when the first black substitution value D1 is greater than the second black substitution value D2;

DETAILED DESCRIPTION

Figure 1:
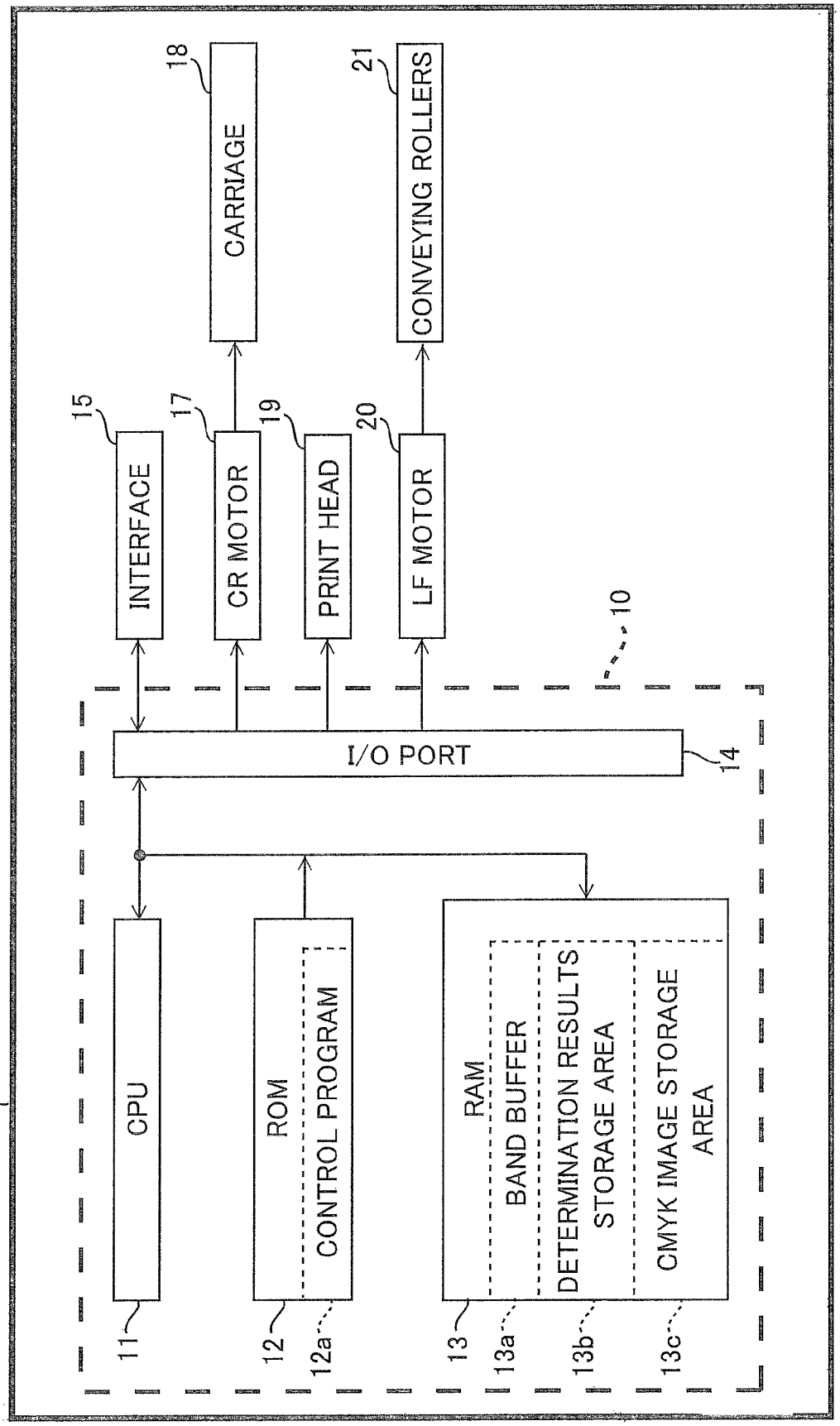
FIG. 1 is a block diagram conceptually showing the electrical structure of a printing device including a print controller according to an embodiment of the invention.

As shown in FIG. 1, a printer 1 includes a control board 10 according to a preferred embodiment. The printer 1 is an inkjet printer that prints color images using a total of four colors of ink: black ink, cyan ink, magenta ink, and yellow ink. The black ink used in the printer 1 according to the preferred embodiment is pigment ink, while the cyan, magenta, and yellow inks (hereinafter referred to as "color inks") are dye-based inks. The permeability properties relative to a recording medium differ among the black pigment ink and the dye-based color inks.

In order to suppress the occurrence of bleeding in images printed on the printer 1, the control board 10 determines which pixels should be subjected to bleed suppression (i.e., which pixels are candidate pixels for bleed suppression) and performs a bleed suppression process on these candidate pixels. It is a particular feature of the embodiment that the control board 10 can reduce the amount of memory used for determining which pixels to subject to bleed suppression.

The printer 1 primarily includes the control board 10, an interface 15, a CR motor 17, a carriage 18, a print head 19, an LF motor 20, and conveying rollers 21.

The control board 10 is also provided with a CPU (processing unit) 11, a ROM 12 for storing data and various control programs 12a executed by the CPU 11, a RAM 13 for temporarily storing data required in processes executed by the CPU 11, and an I/O port 14. The CPU 11, ROM 12, and RAM 13 are connected to the I/O port 14. The CPU 11 operates, by executing the various control programs 12a, as a controller for performing the overall control of the printer 1.

The RAM 13 includes a band buffer 13a, a determination results storage area 13b, and a CMYK image storage area 13c. The CPU 11 receives RGB image data to be processed in units of bands, stores each band of image data one at a time in the band buffer 13a, and performs a printing process for each band unit of image data. This embodiment described below will assume that a page worth of RGB image data is stored in a USB memory device or other storage medium (not shown) connected to the interface 15 and that the CPU 11 reads and processes this RGB image data one band at a time. Here, "RGB image data" denotes bitmap data (pixel data) saved for each pixel indicating the brightness of each color R (red), G (green), and B (blue) in the pixel as a one-byte gradation value (i.e., a value from 0 to 255), for example. In other words, the RGB image data has a plurality of sets of pixel data and represents an image including pixels. Each set of pixel data corresponds to one pixel and has a set of R, G, B value. A "band unit" will indicate a unit of RGB image data that includes five lines worth of pixel data.

Figure 3:
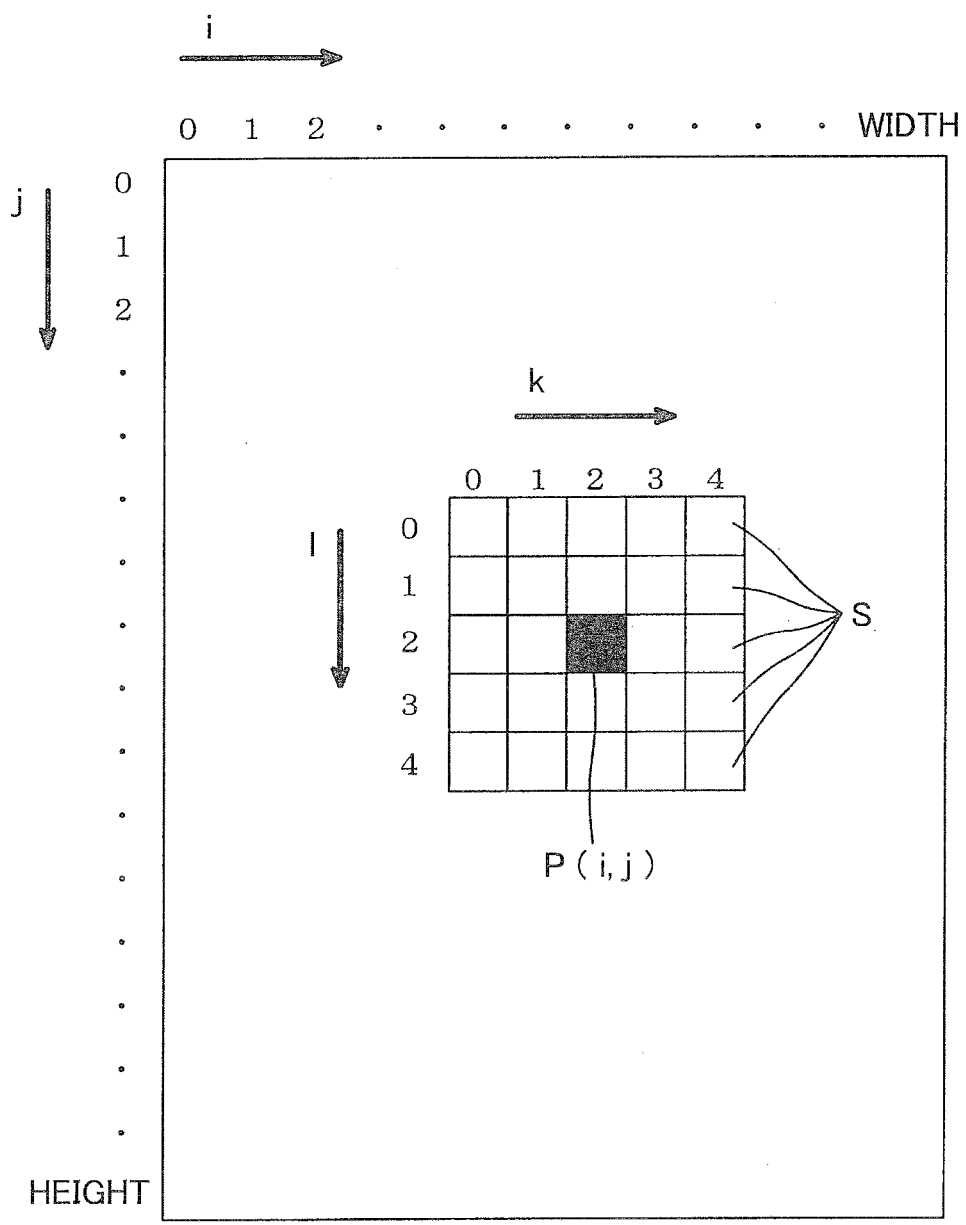
FIG. 3 is a conceptual diagram illustrating an image and image data being processed.

In the following description, each set of pixel data contained in a page worth of RGB image data will be represented by the notation P(i,j), where i indicates the position of a pixel corresponding to the pixel data set in the scanning direction (horizontal direction) and j indicates the position in the conveying direction (vertical direction) as shown in FIG. 3. The values of i and j are based on a point of origin defined as the pixel corresponding to the upper left corner of the image. In a process that will be described later in greater detail with reference to FIGS. 4 and 5, the CPU 11 sequentially sets each pixel data set in the RGB image data as target pixel data and determines whether or not this target pixel data is a candidate for bleed suppression (thereinafter, pixel data to be bleed suppressed will be referred as "subject pixel data".)

The determination results storage area 13b stores one conversion flag for each pixel data set in the RGB image data stored in the band buffer 13a. The conversion flag indicates whether or not the pixel data set is the subject pixel data to be bleed suppression. In the following description, the conversion flag for pixel data P(i,j) in the RGB image data will be represented by the notation FS(i,j). While the process for setting the conversion flags will be described later in greater detail, the CPU 11 initializes each conversion flag to "0" and subsequently resets the conversion flag FS(i,j) to "1" for each pixel data set P(i,j) determined to be the pixel data subject to bleed suppression.

The CMYK image storage area 13c is configured to store CMYK image data obtained by converting the RGB image data. Here, "CMYK image data" denotes bitmap data that indicates the component value of each of the C, M, Y, and K colors for each pixel as a numerical value from 0 to 255, for example. In the following description, the same notation P(i,j) used to represent pixel data in the RGB image data will be used to represent pixel data in the CMYK image data. The CPU 11 executes a bleed suppression process described later on the pixel data P(i,j) in the CMYK image data for which the conversion flag FS(i,j) has been set to "1".

The interface 15, CR motor 17, print head 19, and LF motor 20 are all connected to the I/O port 14. The CPU 11 drives the CR motor 17 to reciprocate the carriage 18 on which the print head 19 is mounted and drives the LF motor 20 to rotate the conveying rollers 21 for conveying sheets of a recording medium P. By controlling the CR motor 17 and LF motor 20 in this way, the CPU 11 can print an image on the sheet of recording medium P based on CMYK image data that was subjected to the bleed suppression process.

Figure 2A:
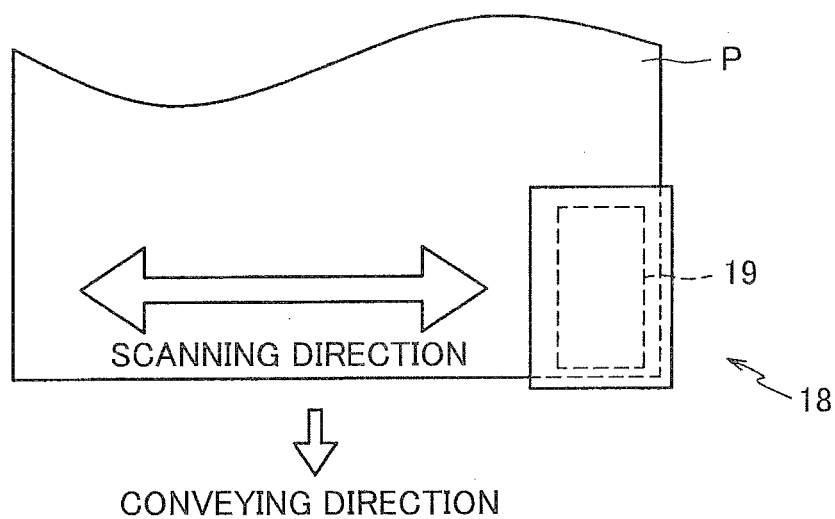
FIG. 2(A) is a plan view illustrating how a carriage of the printing device is scanned over a recording medium.
Figure 2B:
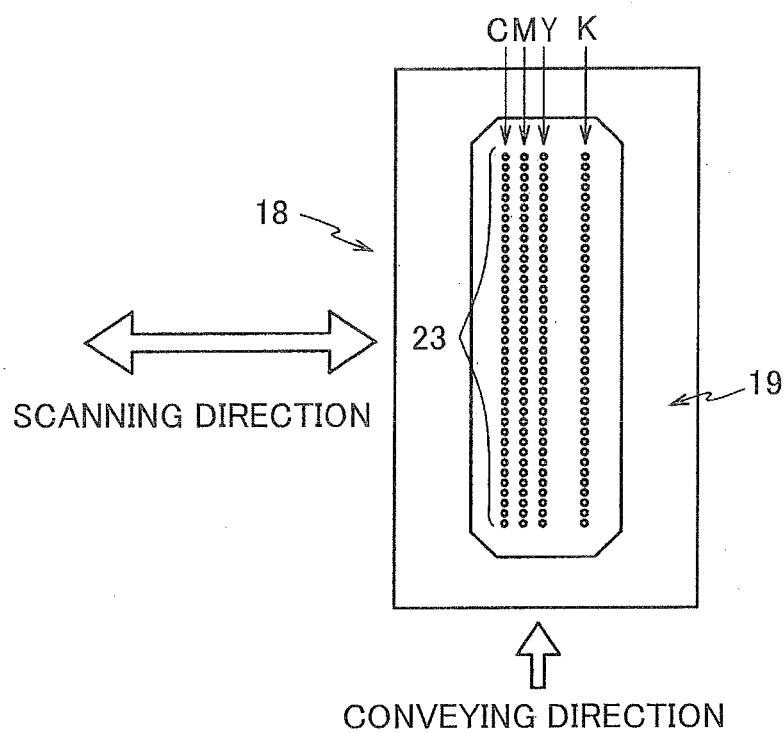
FIG. 2(B) is a bottom view of the carriage showing the configuration of the bottom surface thereof.

The printer 1 prints an image on a sheet of recording medium P by controlling the CR motor 17 to reciprocate the print head 19 mounted on the carriage 18 in a scanning direction shown in FIG. 2(A). While the print head 19 is reciprocated, the printer 1 controls the print head 19 to eject ink droplets in the colors C, M, Y, and K from nozzles 23 formed in a bottom surface of the print head 19, as shown in FIG. 2(B), thereby forming dots on the recording medium P in each ink color. K ink has permeability to the recording medium P smaller than that of C, M, and Y inks (chromatic color inks).

As shown in FIG. 2(B), the plurality of nozzles 23 formed in the bottom surface of the print head 19 is arranged in rows for each of the CMYK ink colors, the rows extending in the conveying direction of the recording medium P. Accordingly, by scanning the print head 19 in the scanning direction orthogonal to the conveying direction while the print head 19 ejects ink from the nozzles 23, the printer 1 can form a plurality of dot rows for each of the CMYK colors.

FIG. 3 conceptually illustrates an image being processed. Each pixel corresponding to the pixel data set in an image is identified by a variable i denoting the pixel position in the width direction (horizontal direction in FIG. 3) and a variable j denoting the pixel position in the height direction (vertical direction in FIG. 3), where a point of origin (0, 0) is defined as the pixel located in the upper left corner. Thus, the notation P(i,j) will be used for identifying pixel data in the following description of the print control process. Further, WIDTH will be used to indicate the width of the image corresponding to page data being processed, and HEIGHT the height of the image. Accordingly, the range of possible values for variables i and j can be specified as $0 \le i \le WIDTH-1$ and $0 \le j \le HEIGHT-1$. In this embodiment, one row of pixel data sets in the RGB image data aligned in the scanning direction will be referred to as "one line," while five lines worth of RGB image data will be referred to as "one band."

In a bleed suppression printing process described later with reference to FIG. 4, the printer 1 sequentially sets each set of pixel data in the RGB image data as target pixel data and determines whether or not the target pixel data is pixel data subject to bleed suppression. Here, all pixels surrounding a target pixel P(i,j) corresponding to the target pixel data that are located within a prescribed number of pixels (2 pixels in this embodiment) from the target pixel P(i,j) in the width direction and within the prescribed number of pixels from the target pixel P(i,j) in the height direction will collectively be referred to as peripheral pixels of the target pixel P(i,j). Thus, the 24 boxes surrounding the pixel P(i,j) in FIG. 3 represent peripheral pixels S of the target pixel data P(i,j).

Each peripheral pixel S is identified by a variable "k" representing the pixel position in the width direction, and a variable "l" representing the pixel position in the height direction, where the peripheral pixel S located in the upper left corner is the point of origin. Hence, the notation peripheral pixel S(k,l) is used to identify a peripheral pixel S in the following description. Since "2" is set to the prescribed number of pixels in the example shown in FIG. 3, the range of possible values for variables "k" and "l" can be expressed by $0 \le k \le 4$ and $0 \le l \le 4$. In other words, each peripheral pixel S is a pixel located within this range from the target pixel. Each peripheral pixel S correspond one set of pixel data which will be referred to "peripheral pixel data" thereafter.

Figure 4:
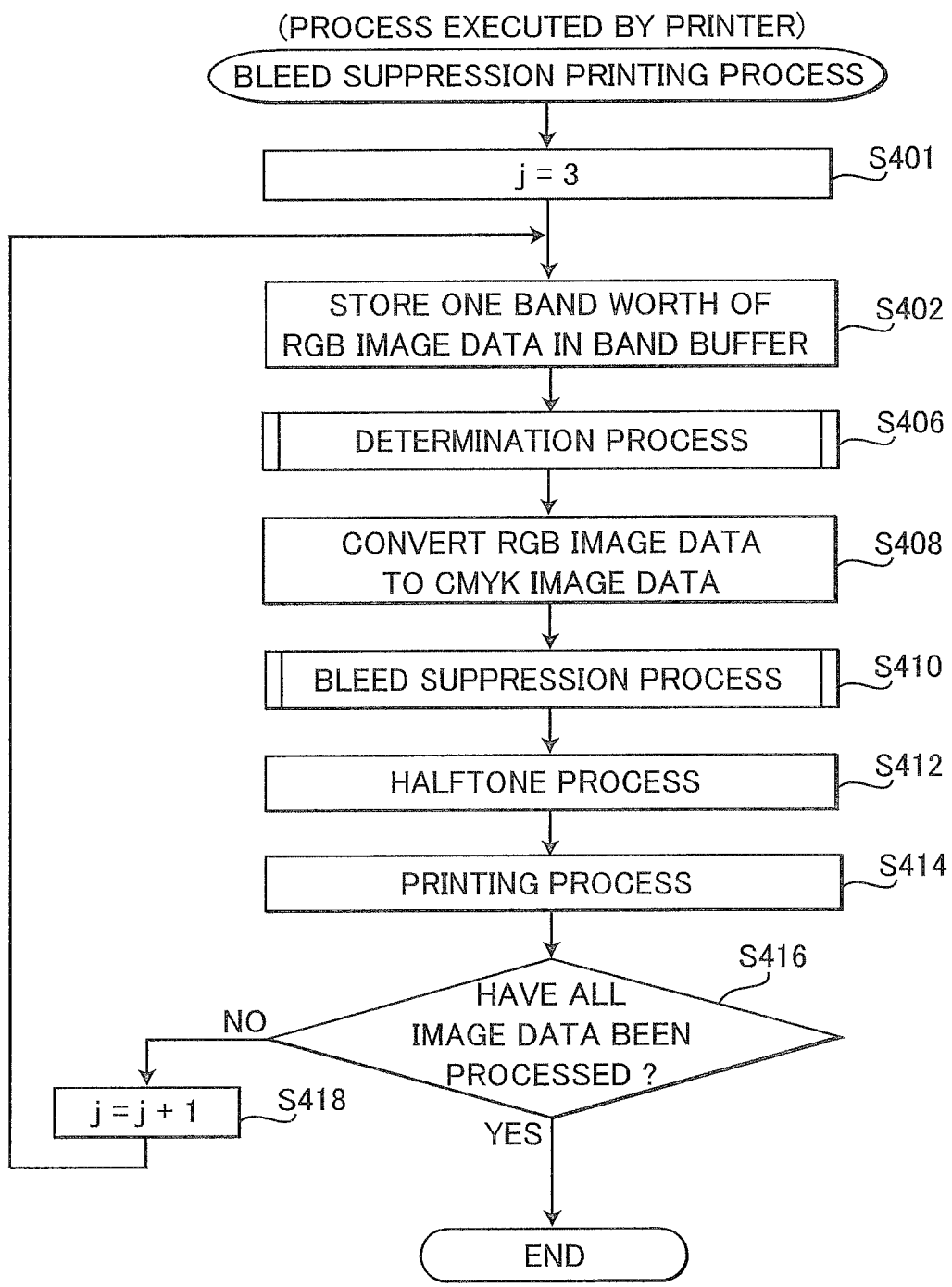
FIG. 4 is a flowchart illustrating steps in a bleed suppression printing process executed by the printing device.

FIG. 4 is a flowchart illustrating steps in the bleed suppression printing process executed by the CPU 11 of the printer 1. The CPU 11 executes this process based on the control programs 12a when a print command is inputted into the printer 1.

In S401 at the beginning of the bleed suppression printing process, the CPU 11 sets a variable j denoting the position of the current process line in the conveying direction to "3". In other words, the CPU 11 sets, as a target line, one of lines contained in the RGB image data. In S402 the CPU 11 acquires one band worth of RGB image data including the row of pixels in the current process line (the row of pixels whose position in the conveying direction is j) from a storage medium connected to the interface 15 and stores this RGB image data in the band buffer 13a. Specifically, the CPU 11 acquires RGB image data for pixel rows in successive five lines whose position J in the conveying direction satisfies the condition j−2≤J≤j+2 as one band worth of RGB image data, and then CPU 11 stores this band of RGB image data in the band buffer 13a. As described earlier, the variable WIDTH represents the number of pixels aligned in the scanning direction of an image corresponding to the RGB image data, and the gradation value for each R, G, and B component contained in the pixel data is expressed by one byte worth of data. Therefore, the band buffer 13a must be designed to store at least [WIDTH×5(number of lines constituting one band)×3 (number of colors)] bytes of data.

In S406 the CPU 11 executes a determination process. In this process, the CPU 11 sequentially sets each pixel data set in the current process line included in the band of RGB image data stored in the band buffer 13a as target pixel data, references the gradation value of the target pixel data and the gradation value of peripheral pixel data corresponding to a peripheral pixel located within a prescribed range from the target pixel, and determines whether or not the target pixel data is the subject pixel data based on the relationships among these gradation values.

FIG. 5 is a flowchart illustrating steps in the determination process. In S502 at the beginning of this process, the CPU 11 advances the pixel data P(i,j) referenced as the target pixel data by one pixel. More specifically, the CPU 11 sets i and j to i+1 and j, respectively. However, the first time that the CPU 11 executes the process in S502 upon beginning the determination process of S406, the CPU 11 initializes i and j to $N_1$ and j, respectively ($N_1$ is set to 3 in this case).

In S503 the CPU 11 acquires RGB values of the target pixel data and calculates an estimated black value (a target-pixel black value) for the target pixel data based on the function f(x) shown below in Equation (1). The target-pixel black value is a black value of the target pixel data indicating the amount of black inks to be used.

$$f(x)=255\times(x/255)^3 \qquad \text{Equation (1)}$$

Here, x=255−max(R,G,B)

In S504 the CPU 11 determines whether or not the estimated black value (f(x)) calculated for the target pixel is greater than or equal to a preset threshold $K_{TH1}$ (64, for example). When the estimated black value for the target pixel P(i,j) is greater than or equal to the threshold $K_{TH1}$ (S504: YES), the CPU 11 determines that the target pixel is a black pixel and advances to S506. On the other hand, if the estimated black value of the target pixel corresponding to the target pixel P(i,j) is less than the threshold $K_{TH1}$ (S504: NO), the CPU 11 determines that the target pixel is a non-black pixel that does not require bleed suppression. Accordingly, the CPU 11 returns to S502 in this case and advances the pixel referenced as the target pixel P(i,j) to the next pixel.

In S506 the CPU 11 advances a pixel referenced as a peripheral pixel S(k,l) by one pixel. That is, the CPU 11 sets, as the peripheral pixel data to be processed, peripheral pixel data set corresponding to a subsequent peripheral pixel. More specifically, the CPU 11 sets the values for variables k and l based on the following formula.

When $k<2N_1, k=K+1$ and l=1

When $k=2N_1, k=0$ and l=l+1

However, when the peripheral pixel S is initially referenced for the target pixel P(i,j), in S506 the CPU 11 sets the peripheral pixel being referenced as the peripheral pixel S to S(0,0).

In S508 the CPU 11 determines whether or not all peripheral pixels S have been processed. Specifically, when k=1 and l=$2_{N1}$, the CPU 11 determines that all peripheral pixels S have been processed (S508: YES) and advances to S516.

However, if there remain peripheral pixels S to be processed (S508: NO), in S510 the CPU 11 determines whether or not an estimated color value (peripheral-pixel color value) for the peripheral pixel S(k,l) is greater than or equal to a preset threshold $CMY_{TH}$ (90, for example). This estimated color value is a value corresponding to the actual color component values and is defined as the sum of a value obtained by subtracting the R gradation value of the peripheral pixel from 255, which is the maximum gradation value that can be set for each of the RGB colors, a value obtained by subtracting the G gradation value of the peripheral pixel from 255, and the value obtained by subtracting the B gradation value of the peripheral pixel from 255. More specifically, the CPU 11 calculates the estimated color value according to Equation (2) below, where the R component value of the peripheral pixel S(k,l) being referenced is [S(k,l)_R], the G component value is [S(k,l)_G], and the B component value is [S(k,l)_B].

$$\text{Estimated color value}=255-[S(k,l)\_R]+255-[S(k,l)\_G]+255-[S(k,l)\_B] \qquad \text{Equation (2)}$$

If the CPU 11 determines that the estimated color value is less than the threshold $CMY_{TH}$ (S510: NO), indicating that the peripheral pixel data corresponding to the peripheral pixel S(k,l) is not a color pixel, then the CPU 11 determines that the target pixel P(i,j) need not be subjected to the bleed suppression process based on the relationship between the peripheral pixel S(k,l) and the target pixel P(i,j). Accordingly, the CPU 11 returns to S506 and advances the pixel referenced as the peripheral pixel S by one pixel.

However, if the CPU 11 determines that the estimated color value (peripheral-pixel color value) is greater than or equal to the threshold $CMY_{TH}$ (S510: YES), indicating that the peripheral pixel S(k,l) is a color pixel, the CPU 11 advances to S511. In S511 the CPU 11 calculates the estimated black value indicating the black component value K of the peripheral pixel S(k,l) from the function f(x) shown in Equation (1) above.

In S512 the CPU 11 calculates the difference between the estimated black value of the target pixel data and the estimated black value of the peripheral pixel data, and determines whether or not this difference is greater than or equal to a prescribed threshold $K_{TH2}$. Specifically, the CPU 11 determines whether or not the absolute value of the value obtained by subtracting the estimated black value of the peripheral pixel from the estimated black value of the target pixel is greater than or equal to the threshold $K_{TH2}$. If the difference between the estimated black values for the target pixel and peripheral pixel is greater than or equal to the threshold $K_{TH2}$ (S512: YES), the CPU 11 determines that the target pixel is a candidate for bleed suppression and in S514 sets the conversion flag FS(i,j) for this target pixel to "1". However, if the CPU 11 determines that the difference between the estimated black values is smaller than the threshold $K_{TH2}$ (S512: NO), then the CPU 11 determines that the target pixel P(i,j) need not be subjected to the bleed suppression process based on the relationship between the peripheral pixel S(k,l) and the target pixel P(i,j). Accordingly, the CPU 11 returns to S506 and advances the pixel referenced as the peripheral pixel S by one pixel.

If, while repeating the process of S506-S512 without a positive determination in S512, the CPU 11 determines in S508 that all sets of peripheral pixel data corresponding to all peripheral pixels S have been processed (S508: YES) or if the CPU 11 reaches a positive determination in S512 and sets the conversion flag FS(i,j) for the target pixel P(i,j) to "1" in S514, then in S516 the CPU 11 determines whether or not all pixel data sets contained in the target line has been processed as the target pixel. That is, the CPU 11 determines whether or not i=WIDTH−1−$N_1$. When the CPU 11 determines that there remain unprocessed pixels in the current process line (S516: NO), the CPU 11 returns to S502, advances the pixel referenced as the target pixel by one pixel, and repeats the above process. The CPU 11 ends the current process upon determining that all pixels in the current process line have been processed (S516: YES) while repeating the above process.

Through the determination process of S406 described above, the CPU 11 can determine whether or not target pixel data is subject pixel data for bleed suppression based on all of a first condition that the estimated black value of the target pixel data is greater than or equal to the threshold $K_{TH1}$, a second condition that the target pixel data has at least one set of peripheral pixel data such that the estimated color value of the peripheral pixel is greater than or equal to the threshold $CMY_{TH}$, and a third condition that the difference between the estimated black value of the target pixel data and the estimated black value of the peripheral pixel data is greater than or equal to the threshold $K_{TH2}$.

Further, the CPU 11 uses the estimated black value calculated according to Equation (1) to determine whether the target pixel is a black pixel (S504), as well as to determine whether or not the difference between the estimated black values for the target pixel and peripheral pixel is greater than or equal to the threshold $K_{TH2}$ (S512).

The reason that the estimated black values are calculated according to Equation (1) in the embodiment will be described here with reference to FIGS. 6(A) and 6(B). Conventional methods of estimating a black component value K from the RGB gradation values have employed Equation (3) below. The value "255" in Equation (3) corresponds to the maximum value that can be set as a gradation value for R, G, and B.

$$K=255-\max(R,G,B) \quad \text{Equation (3)}$$

Figure 6A:
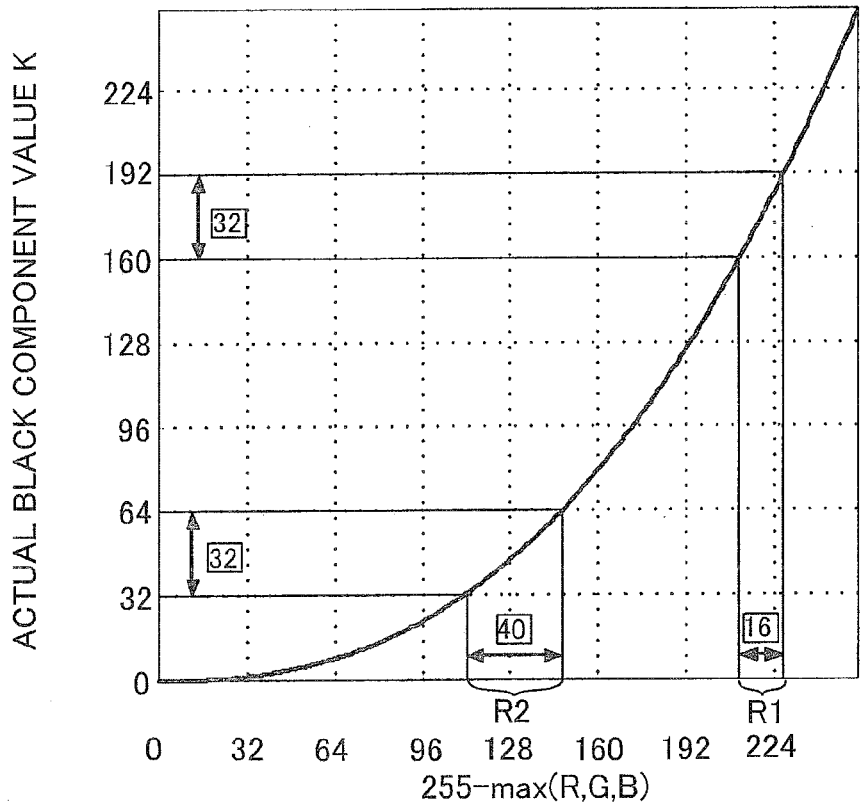
FIG. 6(A) is a graph illustrating the relationship between a conventional estimated black value and actual black component value K, the conventional estimated black value calculated according to the conventional method (255-max(R,G,B)) represented by the horizontal axis, and the actual black component value K represented by the vertical axis.
Figure 6B:
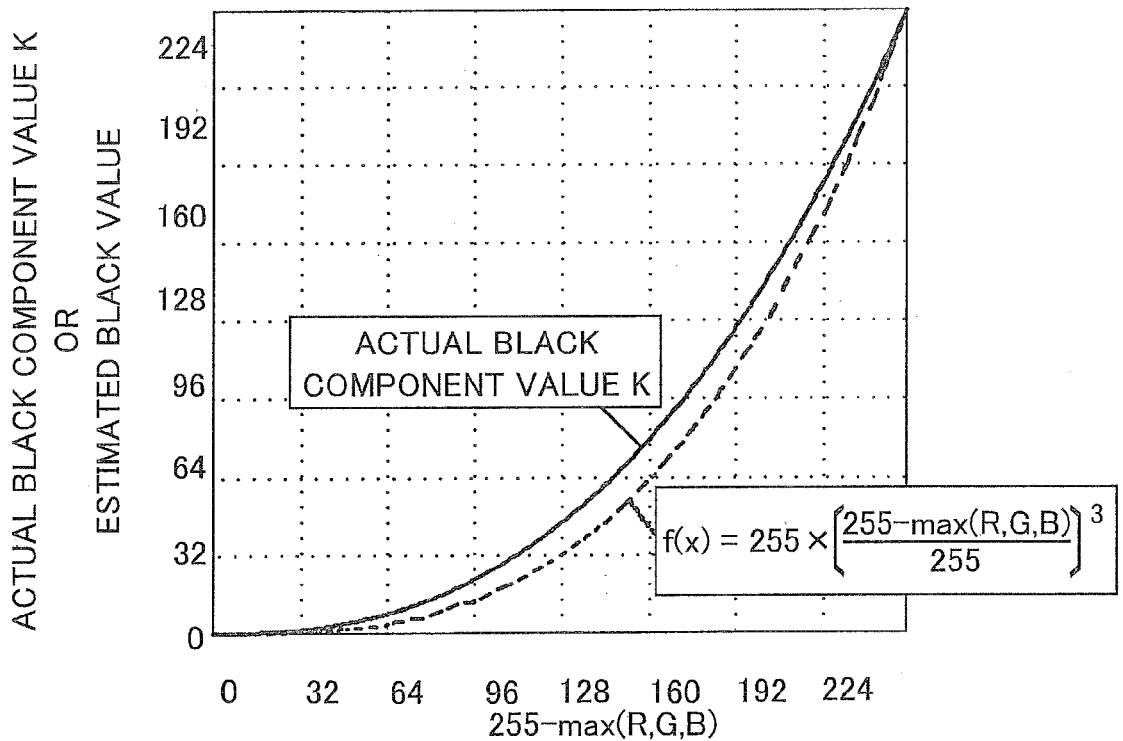
FIG. 6(B) is a graph illustrating the relationship between the (255-max(R,G,B)) represented by the horizontal axis, and the actual black component values K and an estimated black values calculated according to function f(x) represented by the vertical axis.

FIG. 6(A) is a graph illustrating the relationship between an estimated black value calculated according to the conventional method (255−max(R,G,B)) and represented by the horizontal axis, and a suitable black component value K based on actual measurements (hereinafter referred to as the "actual black component value K") and represented by the vertical axis. As shown in FIG. 6(A), differences occur between the estimated black value found according to the conventional Equation (3) and the actual black component value K. These differences are caused by a difference between the gamma characteristics of the RGB color space and the CMYK color space.

As a result, the following types of problems occur when attempting to determine the difference between black component values of a target pixel and its peripheral pixel based on the difference between the estimated black values of the target pixel and peripheral pixel calculated according to Equation (3).

For example, as shown in FIG. 6(A), the difference in the estimated values (255−max(R,G,B)) is a relatively small "16" in a region R1 where the black component value K is large, while the difference between estimated values (255−max(R,G,B)) is a relatively large "40" in a region R2 having a small black component value K, even though the difference between the actual black component values K is "32" for both cases. As a result, it is difficult to determine the magnitude of difference between actual black component values K from the difference in the estimated values calculated based on the conventional Equation (3).

Accordingly, the printer 1 according to this embodiment calculates the estimated black values from function f(x) shown in Equation (1). FIG. 6(B) is a graph illustrating the relationship between (255−max(R,G,B)) represented by the horizontal axis, and the actual black component values K and the estimated black values calculated according to function f(x) represented by the vertical axis. In the graph of FIG. 6(B), the solid line represents the actual black component values K, while the dotted represents the estimated black values calculated according to function f(x) in this embodiment. As can be seen in FIG. 6(B), the characteristics of the function f(x) approach the characteristics of the actual black component values K. Hence, it is possible to determine satisfactorily the difference between actual black component values of the target pixel data and peripheral pixels by determining the difference between the estimated black values of the target pixel and peripheral pixels calculated from function f(x).

By calculating estimated values for black components based on a function f(x) that is convex downward (i.e., concave upward), the printer 1 can appropriately express the difference between the black component values for the target pixel and peripheral pixel based on the difference between estimated values for the target pixel and peripheral pixel. Thus, the printer 1 can more suitably determine which pixels are candidate pixels for bleed suppression. Here, "formulating a function f(x) that is convex downward in the region 0≤x≤maximum value when x is the value obtained by subtracting the largest gradation value among the RGB gradation values for a pixel from the maximum possible gradation value and the function f(x) is the estimated value calculated based on x" means that, if "a value obtained by subtracting the largest gradation value among the gradation values of RGB of a pixel from the maximum possible gradation value" is represented by x and the estimated value of x is expressed by the function f(x), then this function f(x) is convex downward in the region 0≤x≤maximum value. However, the above definition is not limited to treating x as "a value obtained by subtracting the largest gradation value among the gradation values for RGB for one pixel from the maximum possible gradation value."

Here, function f(x) can be modified in various ways to suit the variety of properties possessed by different types of ink and recording media. However, the characteristics of the actual black component values K are convex downward (i.e., concave upward) relative to (255−max(R,G,B)). Therefore, in order to approximate the properties of the actual black component values K, it is possible to formulate a function f(x) that is convex downward within the region 0≤x≤maximum value, where x represents (maximum value—max(R,G,B)) and the function f(x) represents the black component value. Further, while the function f(x) is a cubic equation in x in Equation (1) described above, the function f(x) may instead be a quadratic equation in x or a polynomial equation of the fourth degree or higher. By calculating the estimated values using a polynomial of degree a (where a ≥2) or n-th power of x, it is possible to find the estimated value for each pixel through a simple operation.

Returning to the flowchart in FIG. 4, in S408 the CPU 11 converts the three gradation values for R, G, and B of each pixel in the RGB image data to four color component values for C, M, Y, and K. Specifically, the CPU 11 converts colors in the RGB image data to CMYK image data for a row of pixels in a process line among the one byte worth of RGB image data stored in the band buffer 13a. The CPU 11 stores this CMYK image data in the CMYK image storage area 13c. The color conversion process is performed by converting brightness values for R, G, and B of each pixel to component values of each ink color by referencing a color conversion table having predefined correlations between the RGB brightness values and the ink component values. This process is well known in the art and will not be described herein. Each CMYK image data corresponding to one pixel data includes black component value (K) and three color values (CMY). The black component value indicates the amount of the black inks to be used. Each of CMY color values indicates the amount of one among CMY color inks to be used.

In S410 the CPU 11 executes a bleed suppression process. This process serves to reduce the black component value of pixels in the converted CMYK image data that were determined in the determination process of S406 to be candidate pixels for bleed suppression. In other words, the CPU 11 adjusts the CMYK color image data by decreasing the black component value.

Figure 7:
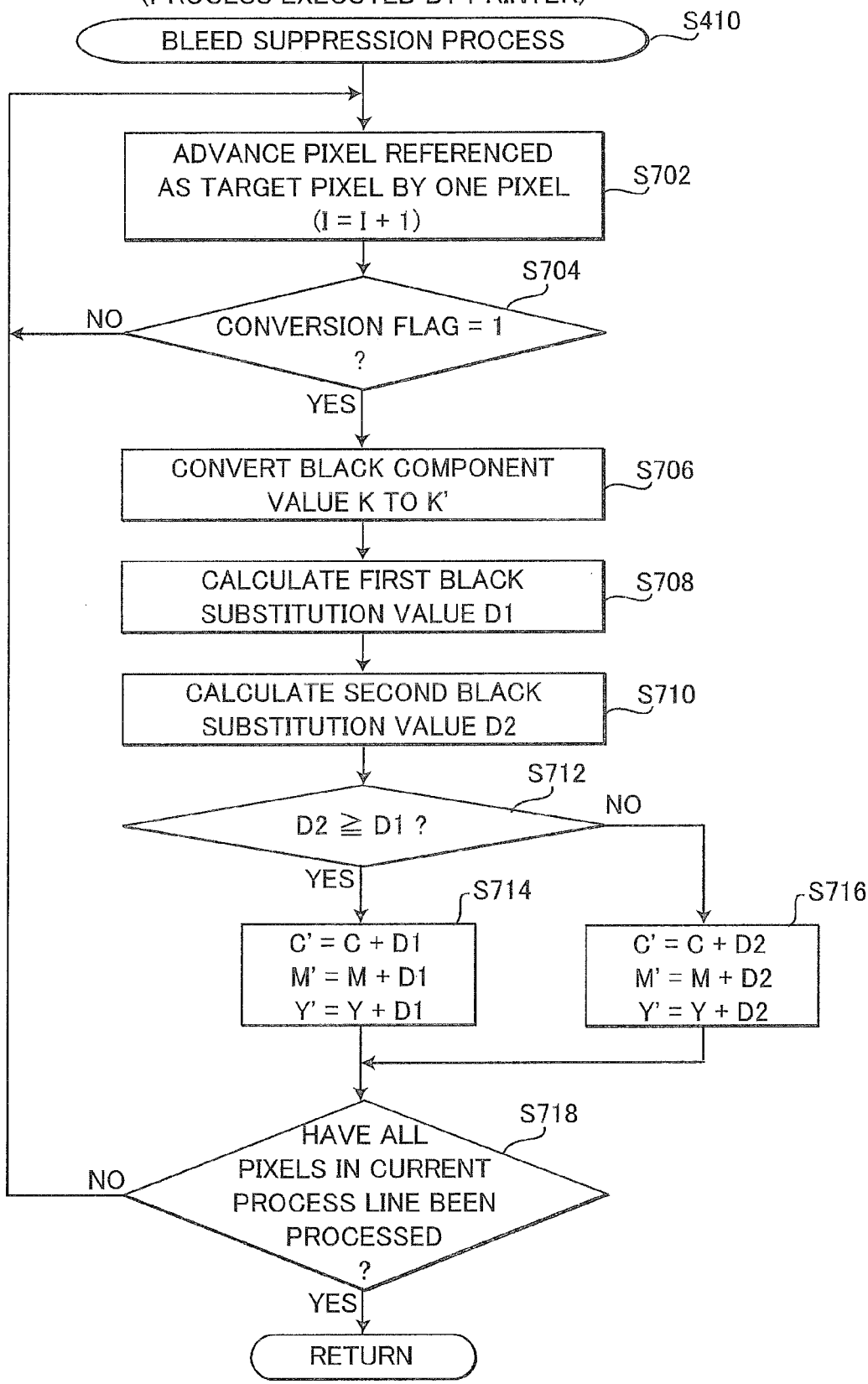
FIG. 7 is a flowchart illustrating steps in a bleed suppression process of the bleed suppression printing process shown in FIG. 4.

FIG. 7 is a flowchart illustrating steps in the bleed suppression process of S410. FIG. 8 includes bar graphs as aids for describing the bleed suppression process. Thus, the bleed suppression process in FIG. 7 will be described next with reference to FIG. 8.

In S702 at the beginning of the bleed suppression process, the CPU 11 advances the pixel being referenced as the target pixel by one pixel in the process line. More specifically, the CPU 11 sets variables i and j to i+1 and j, respectively. However, when executing S702 for the first time after beginning the bleed suppression process of S410, the CPU 11 sets i and j to 0 and j, respectively.

In S704 the CPU 11 determines whether or not the conversion flag FS(i,j) for the target pixel P(i,j) is "1". If the conversion flag FS(i,j) is not "1" (S704: NO), the CPU 11 returns to S702 and repeats the above process.

However, if the conversion flag FS(i,j) is "1" (S704: YES), in S706 the CPU 11 converts the black component value K of the target pixel P(i,j) to a black component value K'. The black component value K' is calculated according to the following equations, for example.

When $0 \le K \le K_{TH1}, K'=K$

When $K_{TH1} \le K \le 255, K'=aK+b$

Here, $a=(K_{MAX}-K_{TH1})/(255-K_{TH1})$ and $b=K_{MAX}-\{(K_{MAX}-K_{TH1})/(255-K_{TH1})\}\times 255$.

$K_{MAX}$ and $K_{TH1}$ may be set arbitrarily as in $K_{TH1}=64$ and $K_{MAX}=140$.

In this way, the CPU 11 reduces the black component value K of the target pixel to the black component value K' calculated according to the above equations. By reducing the black component value K in this way, it is possible to decreases the potential for the black component value of a process pixel to be converted to an ON dot in a halftone process executed later (S412), thereby suppressing bleeding of black ink.

In S708 the CPU 11 calculates a first black substitution value D1 by subtracting the reduced black component value K' from the black component value K prior to reduction. In S710 the CPU 11 calculates a second black substitution value D2 by subtracting the largest of the CMY color component values for the target pixel from the maximum possible value for such components (255, for example).

In S712 the CPU 11 determines whether or not the second black substitution value D2 is greater than or equal to the first black substitution value D1. If the second black substitution value D2 is greater than or equal to the first black substitution value D1 (S712: YES), in S714 the CPU 11 adds the first black substitution value D1 to each of the CMY color component values for the target pixel to produce component values C', M', and Y'. In this way, each component value is converted as illustrated in FIG. 8(A). That is, the CPU 11 further adjusts the CMYK value by increasing the CMY component values.

However, if the second black substitution value D2 is less than the first black substitution value D1 (S712: NO), then in S716 the CPU 11 adds the second black substitution value D2 to each of the CMY color component values of the target pixel to produce component values C', M', and Y'. As a result, the component values are converted as shown in FIG. 8(B).

In S718 the CPU 11 determines whether or not all sets of pixel data in the current process line have been processed. If there remain unprocessed pixels in the current line (S718: NO), the CPU 11 returns to S702 and repeats the process described above. Once all sets of pixel data contained in the current line have been processed after repeating the above steps (S718: YES), the CPU 11 ends the current bleed suppression process.

Through the bleed suppression process of S410 described above, the difference between the black component value K prior to reduction and the black component value K' after reduction is larger when the original black component value K is larger, and the value added to each of the CMY color component values (i.e., the first black substitution value D1) is also larger. In other words, the larger the original black component value K for the target pixel, the greater the probability that CMY ink will be printed for a pixel on the recording paper corresponding to that target pixel.

When CMY ink and black ink are printed on recording paper for the same pixel, the CMY ink acts as a barrier for inhibiting black ink printed at this pixel from bleeding into neighboring pixels and, conversely, for inhibiting black ink in neighboring pixels from bleeding into this pixel. As a result, a darker black color can be rendered using a larger amount of black ink.

Further, since the first black substitution value D1 is added to each of the CMY color component values in the bleed suppression process of this embodiment if the second black substitution value D2 is greater than or equal to the first black substitution value D1, the CPU 11 can prevent the resulting CMY color component values from being larger than the maximum possible value for such color components. This is important because, if the value of a chromatic component resulting from the addition of the first black substitution value D1 exceeds the maximum value possible for that chromatic component, the printer 1 must perform a step to eliminate the excess amount, resulting in a color imbalance.

Returning to the flowchart in FIG. 4, in S412 the CPU 11 executes a well-known halftone process on the CMYK image data resulting from the bleed suppression process in order to generate binary dot data indicating whether a dot is ON or OFF (i.e., whether to form or not form a dot) for each pixel.

In S414 the CPU 11 executes a printing process by driving each component connected to the I/O port 14. Through this process, ink droplets are ejected from the print head 19 to print an image on the recording medium P based on image data that has undergone the bleed suppression process. In other words, the CPU 11 controls the print head 19 to print an image on the recording medium P by using CMYK component values adjusted in S410.

In S416 the CPU 11 determines whether or not all sets of image data have been processed. Here, the CPU 11 specifically determines whether j=HEIGHT−1−$N_1$. If there remains image data to be processed (S416: NO), in S418 the CPU 11 increments j by "1" and returns to S402 to repeat the above process. In other words, the CPU 11 sets a subsequent line as the target line and determines whether or not each pixel data set contained in the subsequent target line is the subject pixel data for bleed suppression. After performing a printing process for the current process line, the CPU 11 sets and updates one of the other unprocessed lines as the next process line, inputs one byte worth of image data including the row of pixels in the next process line, and updates the band buffer 13a with the newly inputted RGB image data. In this way, the CPU 11 repeatedly determines whether or not pixels are candidate pixels for bleed suppression while repeatedly updating the band buffer 13a until the determination has been made for each row of pixels in the page worth of RGB image data currently targeted for printing. After the CPU 11 determines in S416 that all image data has been processed (S416: YES), the CPU 11 ends the current bleed suppression printing process.

Since the printer 1 of this embodiment finds candidate pixels for bleed suppression based on RGB image data in the bleed suppression printing process described above, the bleed suppression printing process according to this embodiment requires less memory for the band buffer 13a than a process that determines candidate pixels for bleed suppression based on image data that has been converted to the four CMYK color component values.

As described above, the printer 1 determines that a pixel set as the target pixel is a candidate pixel for bleed suppression under the conditions that (1) the estimated value corresponding to the black component of the target pixel data is greater than or equal to a prescribed threshold value and (2) the difference calculated by the difference calculating means is greater than or equal to a prescribed value. Accordingly, the printer 1 can use the estimated value to determine a plurality of conditions. By adding more conditions, the printer 1 can more suitably determine candidate pixels for bleed suppression.

Through the determination process of S406 according to this embodiment, the printer 1 determines that pixel data is subject pixel data to be bleed suppressed when the difference between the black component value K for the target pixel and the black component value K for a peripheral pixel is large based on the estimated black values of the target pixel data and the peripheral pixel data. Accordingly, the printer 1 can determine that a target pixel is a candidate for bleed suppression when the target pixel and its peripheral pixel belong to disparate areas of the image. This concept will be described in greater detail with reference to FIGS. 9 and 10.

Figure 9A:
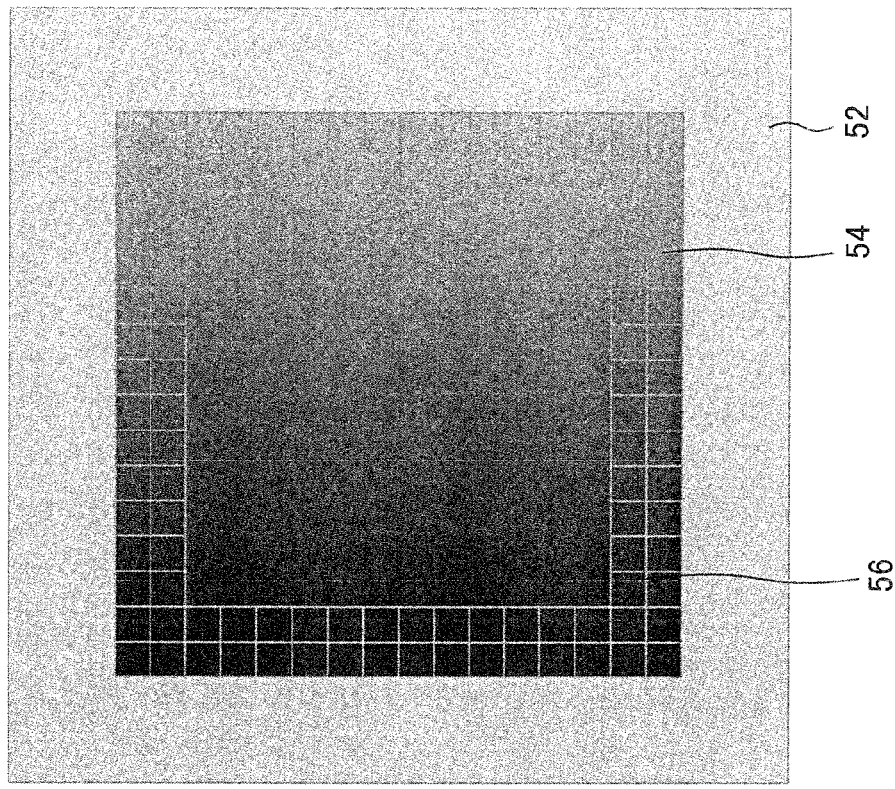
FIG. 9(A) is a diagram showing an example of an image being processed in which solid black elements configured of black pixels having a uniform black component value K are arranged on a background of solid chromatic elements.

FIG. 9(A) shows an example of an image being processed in which solid black elements 50 configured of black pixels having a uniform black component value K are arranged on a background of solid chromatic elements 52. In FIGS. 9 and 10, borderlines 54 are provided to indicate candidate pixels for bleed suppression and do not constitute part of the image being processed. The pixels marked by the borderlines 54 correspond to candidate pixels for bleed suppression.

When the image shown in FIG. 9(A) is subjected to the determination process of FIG. 5, the CPU 11 determines only the black pixels arranged within a two-pixel range from the boundary between the solid black elements 50 and solid chromatic elements 52 as target pixels for the bleed suppression process and executes the bleed suppression process on these pixels. Interior pixels of the solid black elements 50 are not subjected to the bleed suppression process since these pixels do not meet the condition of "having a difference between the estimated black values for the each pixel and the estimated black value of the peripheral pixel is greater than or equal to a prescribed threshold $K_{TH2}$."

Therefore, the printer 1 does not attempt to suppress bleeding in all solid black elements 50 for the image printed on the printer 1, but suppresses bleeding only in regions constituting the border of the solid black elements 50. Accordingly, the printer 1 can eliminate noticeable bleeding of black ink into solid chromatic elements 52 while avoiding a drop in pixel density.

Although the bleed suppression process of FIG. 7, the function of this process is to reduce the value of the black component K in the target pixel data while increasing the values of the chromatic components. In other words, the CPU 11 reduces the probability that black ink will be printed on the recording paper for pixels corresponding to the pixels targeted in the bleed suppression process, while increasing the probability that chromatic ink will be printed for the same pixels. Thus, even when black ink is printed in pixels corresponding to the pixels targeted for the bleed suppression process, the black ink will blend with chromatic ink printed in the same pixel while being inhibited from bleeding into neighboring chromatic pixels. In other words, the chromatic ink printed in the same pixel as black ink functions as a wall for preventing this black ink from bleeding into other elements.

Figure 9B:
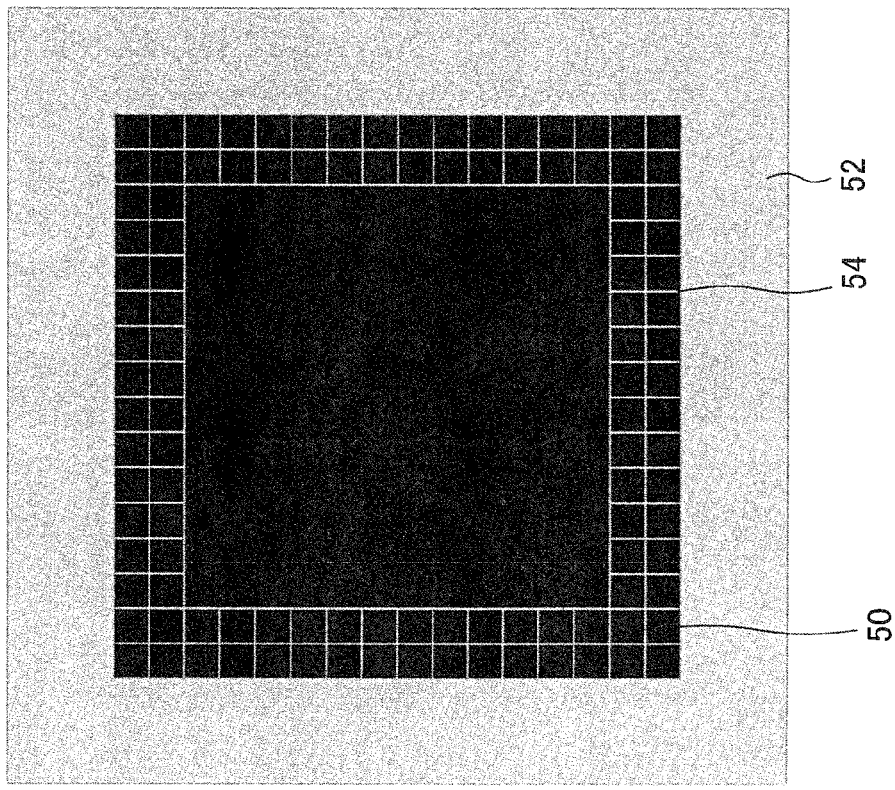
FIG. 9(B) is a diagram showing an example of black gradation elements comprising black pixels that are arranged on a background configured of the solid chromatic elements.

FIG. 9(B) shows an example of black gradation elements 56 comprising black pixels that are arranged on a background configured of the solid chromatic elements 52. A supplementary description is needed here, since the diagrams are depicted in monochrome. The black gradation elements 56 are black pixels having black component values of 64 or greater. The black pixels positioned on the left side in FIG. 9(B) have the highest density, and the densities of the black pixels increases toward the right. At the same time, the densities of the chromatic colors increase toward the right.

When the image shown in FIG. 9(B) is subjected to the determination process of FIG. 5, the CPU 11 determines interior pixels of the black gradation elements 56 are not subjected to the bleed suppression process since these pixels do not meet the condition of "having a difference between the estimated black values for the each pixel and the estimated black value of the peripheral pixel is greater than or equal to a prescribed threshold $K_{TH2}$ (S512 in FIG. 5)." Therefore, the printer 1 does not attempt to suppress bleeding in all black gradation elements 56 for the image printed on the printer 1, but suppresses bleeding only in regions constituting the border of the black gradation elements 56. Accordingly, the printer 1 can eliminate noticeable bleeding of black ink into solid chromatic elements 52 while avoiding a drop in pixel density.

Figure 10B:
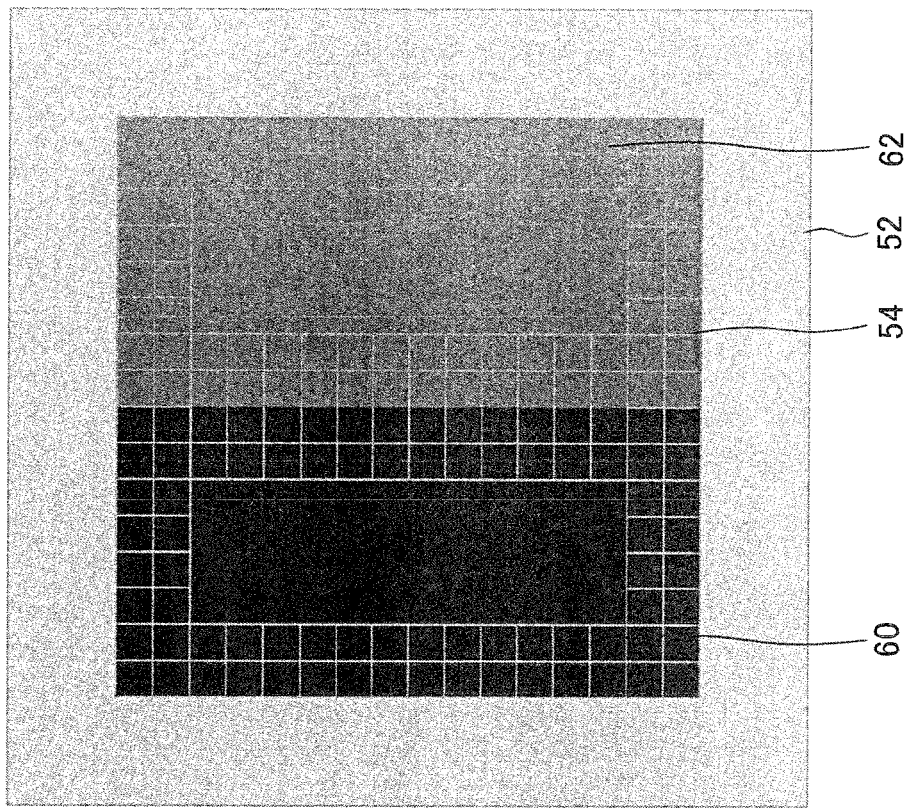
FIG. 10(B) is a diagram showing an example of solid dark black elements and solid light black elements arranged adjacent to each other on a background configured of the solid chromatic elements.
Figure 10A:
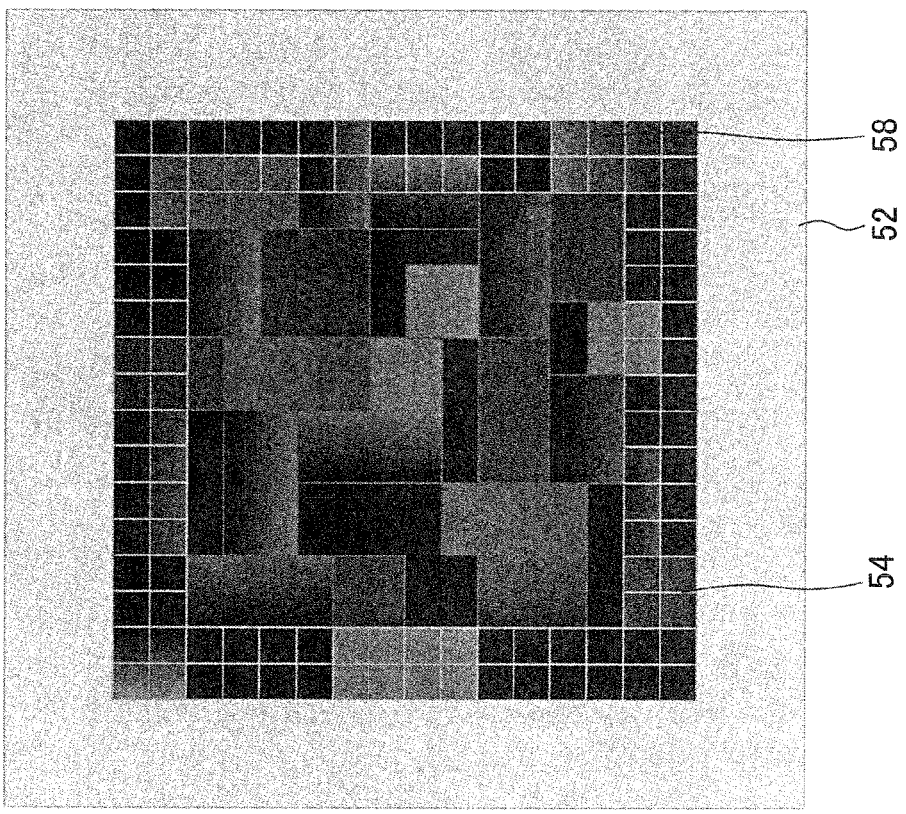
FIG. 10(A) is a diagram showing an example of nonuniform black elements comprising black pixels that are arranged on a background configured of the solid chromatic elements.

FIG. 10(A) shows an example of nonuniform black elements 58 comprising black pixels that are arranged on a background configured of the solid chromatic elements 52. Since the pixels constituting the nonuniform black elements 58 include the chromatic color components of the solid chromatic elements 52 forming the background, these pixels are both black pixels and chromatic pixels and have varied densities of black.

When the image shown in FIG. 10(A) is subjected to the determination process of FIG. 5, the CPU 11 determines interior pixels of the nonuniform black elements 58 are not subjected to the bleed suppression process since these pixels do not meet the condition of "having a difference between the estimated black values for the each pixel and the estimated black value of the peripheral pixel is greater than or equal to a prescribed threshold $K_{TH2}$ (S512 in FIG. 5)." Therefore, the printer 1 does not attempt to suppress bleeding in nonuniform black elements 58 and avoid a drop in pixel density.

FIG. 10(B) shows an example of solid dark black elements 60 and solid light black elements 62 arranged adjacent to each other on a background configured of the solid chromatic elements 52. Since the pixels constituting the solid black elements 60 and 62 include the chromatic color components of the solid chromatic elements 52 forming the background, these pixels are both black pixels and chromatic pixels.

When the CPU 11 determines that the shade of black changes discontinuously between the solid dark black elements 60 and the solid light black elements 62 in the determination process (FIG. 5), the CPU 11 determines pixels constituting the border between the solid dark black elements 60 and solid light black elements 62 as target pixels for the bleed suppression process. On the other hand, when the CPU 11 determines that the black shade changes continuously between the solid dark black elements 60 and solid light black elements 62 (i.e., when the difference between the black components K is less than the threshold $K_{TH2}$), this pixel is not subjected to the bleed suppression process because any bleeding that occurs between the solid black elements 60 and 62 is not likely noticeable since the shade of black changes continuously.

In S512 of the determination process described in FIG. 5, the printer 1 determines whether or not the absolute value of the difference obtained by subtracting the estimated black value of a peripheral pixel from the estimated black value of the target pixel is greater than or equal to the threshold $K_{TH2}$. However, the printer 1 may instead determine whether or not this difference prior to taking the absolute value is greater than or equal to the threshold $K_{TH2}$. In this way, only pixels on the side with dark black will be subjected to the bleed suppression process when a boundary separates dark black pixels from light black pixels.

While the invention has been described in detail with reference to the embodiment thereof, it would be apparent to those skilled in the art that various changes and modifications may be made therein without departing from the spirit of the invention.

For example, while the bleed suppression printing process of FIG. 4 is executed on the control board 10 in the embodiment described above, each step in this process may be executed on a personal computer or other external device connected to the printer 1. In this case, the external device connected to the printer 1 functions as the print controller of the present invention, and a printer driver installed on the external device functions as the print control program of the present invention. When the bleed suppression printing process is executed in this case, in S414 of FIG. 4 the external device can direct the printer 1 to print an image by outputting dot data generated in the halftone process of S412 to the printer 1.

In the above-described embodiment, the printer 1 converts image data for three colors to image data for four colors, where the numbers of colors three and four serve as the respective numbers N and (M+1) in the claims. However, the numbers N and M are arbitrary integers and not limited to the number of colors described in the above-described embodiment. Note that M is an integer greater than or equal to 1; N is an integer greater than or equal to 1 and smaller than (M+1); and black can be reproduced by mixing the M chromatic color inks.

Further, in the embodiment described above, a page worth of RGB image data is stored in a storage medium connected to the interface 15 and this RGB image data is inputted from the storage medium in units of bands. However, the present invention may also be applied to a case in which RGB image data is inputted in units of bands from a personal computer or the like connected to the printer 1 via an interface, for example. The present invention may also be applied to a case in which RGB image data is inputted in units of pages rather than units of bands and stored in the RAM 13.

In the illustrated embodiment, the controller (the CPU 11 and ROM 12) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section, or a plurality of separate dedicated or programmable integrated or other electronic circuits or devices (e.g., hardwired electronic or logic circuits such as discrete element circuits, or programmable logic devices such as PLDs PLAs, PALs or the like). The controller can be implemented using a suitably programmed general purpose controller, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 5-7 can be used as the controller. A distributed processing architecture can be used for maximum data/signal processing capability and speed.

What is claimed is:

1. A print controller comprising:
   a processor; and
   a memory storing computer-readable instructions therein, the computer-readable instructions, when executed by the processor, causing the print controller to perform:
      controlling a printing unit to print an image on a recording medium by using a black ink and M chromatic color inks where 'M' is an integer equal to or greater than 3, the black ink reproducing black that is defined in a first color space and having permeability to the recording medium, each chromatic color ink reproducing one of M chromatic colors that are defined in the first color space and having permeability to the recording medium different from the permeability of the black ink, (M+1) being greater than 3;
      storing a part of image data in the memory, the image data having a plurality of sets of pixel data, the image data representing an image including pixels, each set of pixel data corresponding to a pixel and having a set of R value, G value, and B value defined in an RGB color space, the first color space being different from the RGB color space;

determining, for a set of pixel data, whether or not the pixel data set is subject pixel data to be subjected to a bleed suppression by:

setting the pixel data set as target pixel data;

setting, as peripheral pixel data, pixel data set corresponding to a pixel that is located within a prescribed range from a pixel corresponding to the target pixel data;

acquiring the RGB value set of the target pixel data;

acquiring the RGB value set of the peripheral pixel data;

calculating a target-pixel black value based on the RGB value set of the target pixel data;

calculating, for a set of peripheral pixel data, a peripheral-pixel black value based on the RGB value set of the peripheral pixel data set; and determining whether or not the target pixel data is the subject pixel data based on the target-pixel black value and the peripheral-pixel black value, the target pixel data being determined as the subject pixel data when both a first condition that the target-pixel black value is greater than or equal to a first prescribed value and a second condition that a difference between the target-pixel black value and the peripheral-pixel black value is greater than or equal to a prescribed difference value are satisfied;

converting, for each pixel data set that has been determined whether or not the each pixel data set is the subject pixel data, the RGB value set to a set of (M+1) color values defined in the first color space wherein (M+1) is greater than 3 after the each pixel data set has been determined whether or not the each pixel data set is the subject pixel data, each (M+1) color value set including a black value and M color values, the black value indicating the amount of the black inks to be used, each of M color values indicating the amount of one among the M color inks to be used; and adjusting, for each subject pixel data, the (M+1) color value set by decreasing the black value, the printing unit being controlled to form an image using the adjusted (M+1) color value set.

2. The print controller according to claim 1, wherein the (M+1) color value set is further adjusted by increasing the M color values, black being reproduced by mixing the M chromatic color inks.

3. The print controller according to claim 1, wherein the target pixel data is determined as the subject pixel data when a difference between the target-pixel black value and the peripheral-pixel black value is greater than or equal to a prescribed difference value.

4. The print controller according to claim 1, wherein the target-pixel black value is calculated based on function f(X), the peripheral-pixel black value being calculated based on the function f(X), the function f(X) being convex downward in a region $0 \leq X \leq$ maximum value that can be set, X being obtained by subtracting the largest value among the RGB values from the maximum value.

5. The print controller according to claim 4, wherein the function f(X) is defined by using a-th power of X, 'a' being an integer greater than or equal to 2.

6. The print controller according to claim 5, wherein the pixel data set is determined as the subject pixel data when all of the first condition, the second condition, and a third condition that a peripheral-pixel color value for the peripheral pixel data set is greater than a second prescribed value are satisfied, the peripheral-pixel color value being defined as the sum of a subtracted R value, a subtracted G value, and a subtracted B value, the subtracted R value determined by subtracting the R value from the maximum value, the subtracted G value determined by subtracting the G value from the maximum value, the subtracted B value determined by subtracting the B value from the maximum value.

7. The print controller according to claim 1, wherein the print controller is further configured to perform:

calculating a peripheral-pixel color value for a set of peripheral pixel data when the target-pixel black value is greater than or equal to the first prescribed value, the peripheral-pixel color value being defined as the sum of a subtracted R value, a subtracted G value, and a subtracted B value, the subtracted R value determined by subtracting the R value from a maximum value that can be set, the subtracted G value determined by subtracting the G value from the maximum value, the subtracted B value determined by subtracting the B value from the maximum value; and determining whether or not the peripheral-pixel color value for the peripheral pixel data set is greater than or equal to a second prescribed value;

wherein, when the peripheral-pixel color value for the peripheral pixel data set is greater than or equal to the second prescribed value, a peripheral-pixel black value for the peripheral pixel data set based on the RGB values of the peripheral pixel data set is calculated;

wherein, when the peripheral-pixel color value for the peripheral pixel data set is greater than or equal to the second prescribed value, the difference between the target-pixel black value and the peripheral-pixel black value of the peripheral-pixel data is calculated; and wherein, when the difference is greater than or equal to the prescribed difference value, the target pixel data is determined as the subject pixel data.

8. The print controller according to claim 1, further configured to perform:

setting, as a target line, one of lines contained in the image data, each line including a plurality of sets of pixel data, the part of image data being in the memory and including successive prescribed number of lines containing the target line; and setting a subsequent line as the target line when all pixel data sets contained in the target line has completed to be determined whether or not each pixel data set is the subject pixel data.

9. The print controller according to claim 8, wherein, when the subsequent line is set as the target line, the print controller stores a part of the image data corresponding to the subsequent line in the memory.

10. A non-transitory computer readable storage medium storing a set of program instructions installed on and executed by a print controller for controlling a printing unit to print an image on a recording medium by using a black ink and M chromatic color inks where 'M' is an integer equal to or greater than 3, the black ink reproducing black that is defined in a first color space and having permeability to the recording medium, each chromatic color ink reproducing one of M chromatic colors that are defined in the first color space and having permeability to the recording medium different from the permeability of the black ink, the program instructions comprising:

storing a part of image data into a memory contained in a print controller, the image data having a plurality of sets of pixel data, the image data representing an image including pixels, each set of pixel data corresponding to a pixel and having a set of R value, G value, and B value that are defined in an RGB color space, first color space being different from the RGB color space, (M+1) being greater than 3;

determining, for a set of pixel data, whether or not the pixel data set is subject pixel data to be subjected to a bleed suppression, the determining including:

setting the pixel data set as target pixel data;

setting, as peripheral pixel data, pixel data set corresponding to a pixel that is located within a prescribed range from a pixel corresponding to the target pixel data;

acquiring the RGB value set of the target pixel data;

acquiring the RGB value set of the peripheral pixel data;

calculating a target-pixel black value based on the RGB value set of the target pixel data;

calculating, for a set of peripheral pixel data, a peripheral-pixel black value based on the RGB value set of the peripheral pixel data set; and determining whether or not the target pixel data is the subject pixel data based on the target-pixel black data and the peripheral-pixel black data, the target pixel data being determined as the subject pixel data when both a first condition that the target-pixel black value is greater than or equal to a first prescribed value and a second condition that a difference between the target-pixel black value and the peripheral-pixel black value is greater than or equal to a prescribed difference value are satisfied;

converting, for each pixel data set that has been determined whether or not the each pixel data set is the subject pixel data, the RGB value set to a set of (M+1) color values defined in the first color space wherein (M+1) is greater than 3, each (M+1) color value set including a black value and M color values, the black value indicating the amount of the black inks to be used, each of M color values indicating the amount of one among the M color inks to be used;

adjusting, for each subject pixel data, the (M+1) color value set by decreasing the black value; and controlling the printing unit to form an image using the adjusted (M+1) color value set.

11. The print controller according to claim 1, wherein the M color values include at least C value indicating an amount of cyan inks to be used, M value indicating an amount of magenta inks to be used, and Y value indicating an amount of yellow inks to be used.

12. A print controller comprising:

a processor; and a memory storing computer-readable instructions therein, the computer-readable instructions, when executed by the processor, causing the print controller to perform:

controlling a printing unit to print an image on a recording medium by using a black ink and M chromatic color inks where 'M' is an integer equal to or greater than 1, the black ink reproducing black that is defined in a first color space and having permeability to the recording medium, each chromatic color ink reproducing one of M chromatic colors that are defined in the first color space and having permeability to the recording medium different from the permeability of the black ink;

storing a part of image data in the memory, the image data having a plurality of sets of pixel data, the image data representing an image including pixels, each set of pixel data corresponding to one pixel and having a set of N color values, each color value indicating one of N colors that are defined in a second color space, the second color space being different from the first color space, N being an integer that is greater than or equal to 1 and smaller than (M+1);

(a) determining, for one set of pixel data, whether or not the one pixel data set is subject pixel data to be subjected to a bleed suppression, the (a) determining including:

setting the one pixel data set as target pixel data, setting, as peripheral pixel data, pixel data set corresponding to a pixel that is located within a prescribed range from a pixel corresponding to the target pixel data;

acquiring the N color value set of the target pixel data;

acquiring the N color value set of the peripheral pixel data; and (b) determining, using the N color value set of the target pixel data and the N color value set of the peripheral pixel data set wherein N is less than (M+1), whether or not the target pixel data is the subject pixel data;

converting, for each pixel data set, the N color values set defined in the second color space to a set of (M+1) color values defined in the first color space wherein (M+1) is greater than N, each (M+1) color value set including a black value and M color values, the black value indicating the amount of the black inks to be used, each of M color values indicating the amount of one among the M color inks to be used; and adjusting, for each subject pixel data, the (M+1) color value set by decreasing the black value, the printing unit being controlled to form an image using the adjusted (M+1) color value set, wherein the second color space is RGB color space, N being set to 3, N color value set being a set of R value, G value, and B value, wherein the (a) determining further comprises:

calculating a target-pixel black value based on the RGB values of the target pixel data;

calculating, for one set of peripheral pixel data, a peripheral-pixel black value based on the RGB values of the one peripheral pixel data set; and calculating, for the one peripheral-pixel data set, a difference between the target-pixel black value and the peripheral-pixel black value, and wherein, when both a first condition that the target-pixel black value is greater than or equal to a first prescribed value and a second condition that the difference is greater than or equal to a prescribed difference value are satisfied, the target pixel data is determined as the subject pixel data in the (a) determining.

* * * * *